No. 874,158. PATENTED DEC. 17, 1907.
M. J. BOVARD.
SKIRT MEASURING DEVICE.
APPLICATION FILED AUG. 8, 1906.
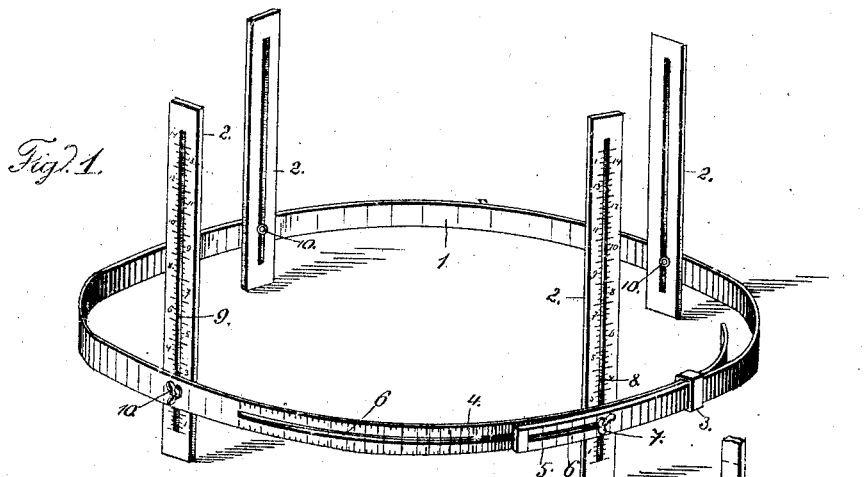
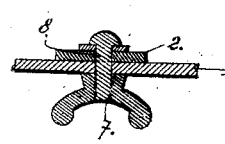
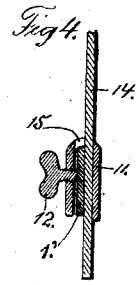
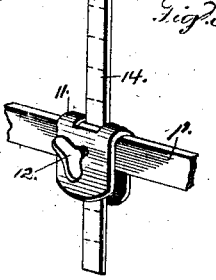
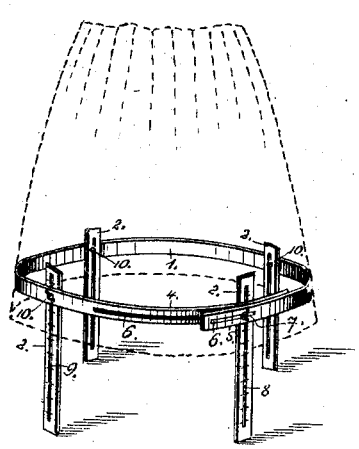
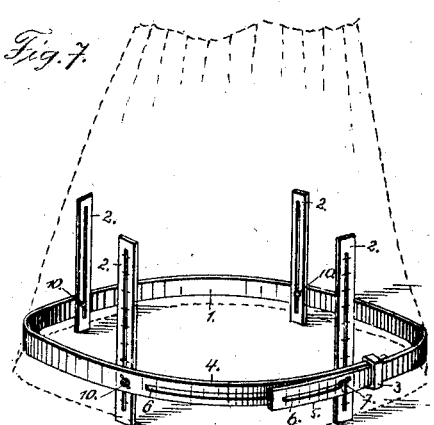
Witnesses:
A. H. Rubsag,
P. K. H. Butler
Inventor:
Mary Jane Bovard
by H. C. Evert & Co.
Attorneys

UNITED STATES PATENT OFFICE.

MARY JANE BOVARD, OF OIL CITY, PENNSYLVANIA.

SKIRT-MEASURING DEVICE.

No. 874,158.　　　Specification of Letters Patent.　　Patented Dec. 17, 1907.

Application filed August 8, 1906. Serial No. 329,786.

*To all whom it may concern:*

Be it known that I, MARY JANE BOVARD, a citizen of the United States of America, residing at Oil City, in the county of Venango and State of Pennsylvania, have invented certain new and useful Improvements in Skirt-Measuring Devices, of which the following is a specification, reference being had therein to the accompanying drawing.

This invention relates to certain new and useful improvements in skirt measuring devices, and the invention has for its object to provide a device or instrument for measuring the bottom edges of a skirt, the device being placed upon the floor or suitable platform to determine the height of the skirt above the floor or platform, also the circumference of the skirt.

The skirt measuring device is particularly adapted for dress makers, fitters, and tailors and can be advantageously used by these artisans when fitting a skirt upon a person, to determine the length of the skirt, the amount of material to be used as a hem, and the contour of the lower edges of the skirt. To this end, I have devised a simple and inexpensive device or instrument which can be easily and quickly adjusted when used in connection with a skirt or similar garment.

The detail construction of my improved skirt measuring device or instrument will be hereinafter more fully described and specifically pointed out in the claims.

Referring to the drawing forming part of this specification, like numerals of reference designate corresponding parts throughout the several views, in which:—

Figure 1 is a perspective view of the device, Fig. 2 is a detail sectional view of the same, showing the means by which the circular band is secured to the standards. Fig. 3 is a detail sectional view of the adjustable band of the device, illustrating the edge of a skirt in connection with the same, Fig. 4 is a vertical sectional view of a clamp forming a modification of my invention, Fig. 5 is a perspective view of the same, Fig. 6 is a perspective view of the device as used in connection with a skirt, the skirt being illustrated in dotted lines, and Fig. 7 is a similar view of a device constructed upon a large scale.

The skirt measuring device illustrated in Figs. 1, 6 and 7 of the drawings, are identical in construction, these views simply illustrating the adjustment of the device, which principally consists of an adjustable band 1, and adjustable standards or legs 2, the latter being identical in construction. The band 1 is preferably made of a resilient strip of metal and has its overlapping ends adjustably connected together by a strip 3. The overlapping ends 4 and 5 of the band 1 are slotted, as at 6 and these ends are held in a fixed position by a thumb screw 7 which passes through the slots of ends 4 and 5 and through a vertically disposed slot 8 of one of the standards or legs 2. The end 4 of the band 1 is graduated, whereby the circumference of the band can be easily determined. The standards or legs 2 are preferably made of metal having sufficient rigidity to support the band 1, the standards or legs being graduated, as at 9, adjacent to the slots 8, whereby the height of the band 1 relative to the floor or platform upon which it is supported may be easily and quickly determined. The legs 2 are temporarily fixed to the band 1 by thumb screws 10 similar to thumb screw 7, these thumb screws being of a conventional form employed to frictionally hold two pieces of material together.

In Figs. 4 and 5 of the drawings, I have illustrated a slight modification wherein a yoke 11 and a set screw 12 are employed for adjustably securing the standard or leg 14 to the band 1', thereby dispensing with the slotted standard or leg 2, previously described. The yoke 11 is slotted as at 15, to permit of the legs or standards 14 extending therethrough, and a set screw 12 is adapted to frictionally hold the band 1' and the leg or standard 14 against the inner portion of the yoke 11.

In practice, the skirt to be measured by my improved device or instrument is turned wrong side out and is placed upon the person for whom the skirt is made. The person then steps into the center of the device or instrument, and allows the skirt to hang over the standards or legs 2, and the band 1. The band 1 of the device or instrument is then adjusted to snugly fit the inner edges of the skirt, the lower edges of the skirt being held taut by the device, to permit of the skirt being marked and cut to indicate the height of the skirt above the floor or platform and the amount of material to form the hem of the skirt. After the band 1 has been adjusted to the proper height relative to the floor or platform, the edges of the skirt are turned up as at 16, (see Fig. 3) and the right side of the skirt marked to indicate the fold of the material to form the hem. The amount of hem to be left upon the skirt having been determined, the excess amount of material is cut from the skirt and the skirt is in condition to be finished. After the skirt has been removed from the person it is turned upon its right side, and the lower edges thereof folded according to the marks made by the fitter of the skirt, and the hem completed.

By the novel construction of the device, it will be observed that one edge of the band can be lowered relative to its opposite edge, thereby permitting of the lower edges of the skirt being accurately marked when the back of the skirt is to be of a greater length than the front thereof.

What I claim and desire to secure by Letters Patent, is:—

1. A skirt measuring device comprising a resilient circular metal band having slotted graduated ends, slotted graduated standards, and means comprising bolts carried by said circular resilient metal band, slidable in the slots of said standards, and a winged nut adapted to retain said standards in engagement with said metal band, substantially as described.

2. A device of the character described, a circular metal band, a plurality of slotted standards, and means slidable in said slots and carried by said circular band for adjustably securing said circular band to each of said standards substantially as described.

In testimony whereof I affix my signature in the presence of two witnesses.

MARY JANE BOVARD.

Witnesses:
JOHN A. F. BOVARD,
AGNES BOVARD.